United States Patent
Horiuchi et al.

(10) Patent No.: US 6,185,020 B1
(45) Date of Patent: Feb. 6, 2001

(54) APPARATUS FOR DETECTING A FAULT LOCATION IN AN OPTICAL FIBER LINE

(75) Inventors: Yukio Horiuchi; Shiro Ryu, both of Tokyo (JP)

(73) Assignee: Kokusai Denshin Denwa Kabushiki Kaisha, Tokyo (JP)

( * ) Notice: Under 35 U.S.C. 154(b), the term of this patent shall be extended for 0 days.

(21) Appl. No.: 08/905,178

(22) Filed: Aug. 4, 1997

(30) Foreign Application Priority Data

Aug. 5, 1996 (JP) .................................... 8-205677

(51) Int. Cl.⁷ .......................... H04B 10/12; H04B 10/18; H04J 14/02
(52) U.S. Cl. .......................... 359/110; 359/161; 359/173; 359/124
(58) Field of Search ................... 359/110, 161, 359/173, 124; 356/73.1

(56) References Cited

U.S. PATENT DOCUMENTS

| | | | |
|---|---|---|---|
| 4,928,004 | 5/1990 | Zimmermann et al. | 250/227.14 |
| 4,950,883 | 8/1990 | Glenn | 250/227.14 |
| 5,177,354 * | 1/1993 | Tomita et al. | 356/73.1 |
| 5,592,577 | 1/1997 | Tanoue | 385/12 |
| 5,684,297 * | 11/1997 | Tardy | 385/12 |
| 5,771,250 * | 6/1998 | Shigehara et al. | 359/110 |
| 5,848,204 * | 12/1998 | Wanser | 385/12 |

FOREIGN PATENT DOCUMENTS 0432734   6/1991  (EP) .
0447439 * 7/1991  (EP) .

OTHER PUBLICATIONS

"Optical Fiber" Paragraph 12.4, published by Oymsya, Ltd. (This Japanese–language reference is discussd on p. one in the application).

Single–Mode Optical Fiber Measurement: Characterization and Sensing; Giovanni Cancellieri; Editor; Artech House.

* cited by examiner

Primary Examiner—Jason Chan
(74) Attorney, Agent, or Firm—Christie, Parker & Hale, LLP

(57) ABSTRACT

Disposing optical fiber gratings 10a each reflecting a wavelength $\lambda 1$ which is different from a signal wavelength $\lambda s$ along an optical fiber line 10 at suitable intervals and positions. The wavelength $\lambda s$ of signal light is not reflected by the grating 10a, but transmitted through the optical fiber line 10. An optical pulse tester 14 outputs probe pulse lights of wavelengths $\lambda 0, \lambda 1$, which are different from the signal wavelength $\lambda s$, at slightly different times. The probe lights of the wavelengths $\lambda 0, \lambda 1$ are input into the optical fiber line 10 through an optical adding and dividing device 16 and transmitted through the optical fiber line 10. Reflected light of the wavelength $\lambda 1$ of probe light contains therein reflection pulses of the grating 10a, and each reflection pulse serves as a position reference. The probe light of the wavelength $\lambda 0$ does not contain reflection light of the grating 10a. Comparison of the reflected lights of the wavelengths $\lambda 0, \lambda 1$ to each other by the optical pulse tester 14, provides determination of whether there is a fault location, and, if so, detection of fault location with high precision can be made.

13 Claims, 12 Drawing Sheets

(1) Measured Waveform by the probe light of λ1

(2) Measured Waveform by the probe light of λ0

APPARATUS FOR DETECTING A FAULT LOCATION IN AN OPTICAL FIBER LINE

FIELD OF THE INVENTION

This invention relates to an apparatus for detecting a fault location in an optical fiber line.

BACKGROUND OF THE INVENTION

For monitoring and maintenance of optical fiber lines of an optical fiber communication system, an optical pulse tester has been widely used. The optical pulse tester is an apparatus that can measure a loss distribution in a longitudinal direction of the optical fiber, and can detect a localized increase of loss or trouble of rupture of the optical fiber, as well. With the optical pulse tester, short optical pulses generated periodically are incident on the optical fiber, and the light intensity of a Rayleigh back-scattered light, which is produced by such short optical pulses on the optical fiber, is observed on a time base, thereby to measure a loss with respect to a distance. Details are described in a literature entitled "OPTICAL FIBER", Paragraph 12.4, published by Ohmsya, Ltd.

FIG. 9, FIG. 10 and FIG. 11 each shows a schematic structural block diagram of a conventional basic optical communication system, respectively. These conventional systems differ from one another in a manner of connecting the optical pulse tester with the optical fiber line. Station A serves as an optical sending terminal station comprising an optical sending apparatus 110, and station B serves as an optical receiving terminal station comprising an optical receiving apparatus 112, and stations A and B are respectively provided with optical pulse testers 114 and 116. Numeral 118 designates an optical fiber line.

In FIG. 9, an end 118a of the optical fiber line 118 on the side of the station A is adapted to be selectively connected with an output end of the optical sending apparatus 110 and an input/output end of the optical pulse tester 114, while an end 118b of the optical fiber line 118 on the side of the station B is adapted to be selectively connected with an input end of the optical receiving apparatus 112 and an input/output end of the optical pulse tester 116. Normally, the ends 118a and 118b of the optical fiber line 118 are respectively connected with the output end of the optical sending apparatus 110 and the input end of the optical receiving apparatus 112. Then when the necessity of performing tests arises, the end 18a of the optical fiber line 118 is connected with the input/output end of the pulse tester 114 or the end 118b of the optical fiber line 118 is connected with the input/output of the pulse tester 116.

Referring to FIG. 10, the optical pulse testers 114, 116 are always connected with the optical fiber line 118 by means of optical adding and dividing devices 120, 122. Thereby, this arrangement can be ready for use when conducting of tests becomes necessary, without switching over the connections as in the case of FIG. 9. Further, the output lights of the optical pulse testers 114, 116 may be made to have a waveband consisting of wavelengths different from a wavelength of the output light of the optical sending device 110, and this provides an advantage of measuring the optical fiber line 118 even during transmission of signals.

FIG. 11 shows an arrangement for making the best of the optical pulse testers 114, 116 in the case of having a plurality of optical fiber lines, wherein optical switches 124, 126 are provided to connect the output lights (and reflecting lights) of the optical pulse testers 114, 116 with a target optical fiber line (or the adding and dividing device connected thereto).

As described above, the optical tester is to observe the light intensity on a time base, so that it is necessary to convert the time base into a distance. A distance L with respect to a time t lapsed after the sending of pulses is expressed by:

$$L = ct/2n$$

wherein c is a light velocity and n is a coefficient which is called a group refractive index of optical fiber and referred to a propagation velocity of the optical signal when it advances through the optical fiber. The group refractive index n depends on design parameters and materials of the optical fiber. Generally, with the optical fiber having a zero dispersion wavelength in a 1.3 micron band, the n is in the order of 1.460~1.465, and with the optical fiber having a zero dispersion wavelength in a 1.55 micron band, the n is in the order of 1.470~1.475.

Accordingly, even if the pulse tester has a very high time accuracy, an error in the group refractive index n becomes an error in distance (uncertainty). The longer the distance of an observation point, the larger the absolute error becomes, and it is thought that with the above-mentioned parameters an error becomes as great as about 340 m for 100 km distance. The group refractive index n differs from one optical fiber to the other optical fiber, and it is possible to control each optical fiber constituting the optical fiber line, but this is not practical, because the data processing becomes quite complicated. Further, when a route for laying the optical fiber line is changed, comparison with previously observed data cannot be made, and, thus, an error in the actually laid position becomes greater.

Assuming, for example, the optical fiber cable is laid in a side-gutter along the rail way or the road, the gutter is covered by a lid after laying the optical fiber cable to protect the cable from an external influence. With this condition, if a trouble has occurred in a portion of the cable in this section, it is not possible to confirm the trouble by visual observation of a terrain appearance. In this case, for checking a possible fault location it is necessary to remove the lid of the gutter in a wide range including fore and after of the possible fault location, by taking into consideration a measuring error. Further, when the optical fiber cable is laid in and along the expressway, it is necessary to block or restrict traffic in a wide range of lanes to perform confirmation work of the possible fault location. Needless to say, such work becomes more difficult for embedded cables.

Further, in urban areas, the optical fiber cable is laid in and along a conduit under the road, and it is necessary to check the fault location by entering into a manhole provided in the public road. An interval between manholes is in the order of 100 m at the shortest, and considering the above-mentioned error of about 340 m in measuring the fault location, the manhole which is close to the fault location cannot be specified, and the fault location should be sought from, for example, manholes at four places. However, such work on the public road greatly affects the traffic network as it causes, for example, a long hours of traffic delay.

As such, with the precision of prior art, ascertaining the fault location requires many steps of operation, which is costly. Also, as a result, many hours are required until the communication is restored. Thus, in the case where the optical fiber cable is laid adjacent to or accompanying the public traffic network, the affect given to the traffic network is too great.

OBJECT AND SUMMARY OF THE INVENTION

Thus, an object of the present invention is to provide an apparatus for detecting a fault location in an optical fiber line which can detect such fault location with a higher precision, thereby to solve the aforementioned problems of prior art.

According to the invention, reflecting means having a different wavelength from a signal wavelength is positioned at one or more places on an optical fiber line. Reflecting means comprises, for example, an optical fiber grating. A probe pulse light having a wavelength fully meets with the reflecting wavelength is directed to incident on the optical fiber line, and a reference point corresponding to the position of the reflecting means is detected from the reflecting light. In this manner, a plurality of distance references can be obtained, thereby a precision of conversion from time to distance is improved. That is, the reflecting light from the reflecting means, whose position is clearly known, is made a distance marker, and the distance from an unusual point (a fault location) of backward scattering light to the distance marker is measured.

With the use of the probe pulse light having a wavelength which is different from either the reflecting wavelength of the reflecting means or the signal wavelength, a time variation of the Rayleigh back-scattered light of the optical fiber line, namely, a fine variation with respect to the distance, can be checked without being affected by the reflecting means, and the state of each position and a fault location of optical fiber line can be checked with a higher precision. With a probe pulse light having a wavelength which is same with the reflecting wavelength of the reflecting means, it is possible to detect whether there is a trouble, and if any, a degree of trouble and its position, but it is affected by the reflecting means. The influence of the reflecting means can be eliminated by using the probe pulse light having a wavelength which is different from the reflecting wavelength of the reflecting means.

DESCRIPTION OF THE PREFERRED EMBODIMENTS

Preferred embodiments of the invention will be described below in detail by referring to the accompanying drawings.

Figure 1:
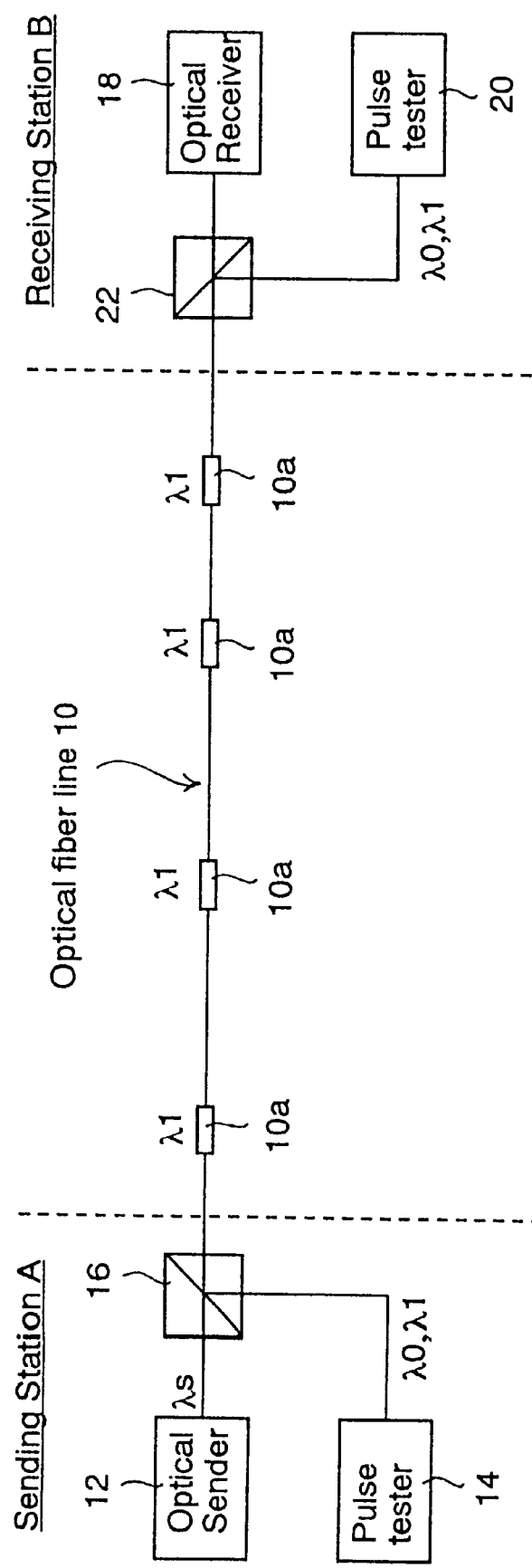
FIG. 1 is a schematic structural block diagram of an embodiment of this invention.

FIG. 1 is a schematic structural block diagram of an embodiment of this invention. On an optical fiber line 10 extending between a sending station A and a receiving station B, optical fiber gratings 10a, 10a, 10a, 10a, which reflect a wavelength $\lambda 1$ that is different from a signal wavelength $\lambda s$ are placed at appropriate positions with suitable intervals.

The sending station A comprises an optical sending apparatus 12 for generating a signal transmission light of a wavelength $\lambda s$; an optical tester 14 for generating a prove pulse light of wavelengths $\lambda 0$, $\lambda 1$ and measuring the intensity of its reflected light on a time base; and an optical adding and dividing device 16 adapted to direct an output light from the optical sending apparatus 12 to incident on the optical fiber line 10, to direct the probe light outputted by the optical pulse tester 14 to incident upon the optical fiber line 10, and to input the light reflected on the optical fiber line 10 into the optical pulse tester 14. The optical adding and dividing device 16 is, as shown in FIG. 1, comprising a half mirror in terms of its function.

The receiving station B has, except its function of receiving rather than sending of signal light, basically the same structure as the sending station A, comprising a light receiving apparatus 18 for receiving the signal light which has been transmitted through the optical fiber line 10; an optical pulse tester 20 for generating probe lights of wavelengths $\lambda 0$, $\lambda 1$ same as the optical pulse tester 14 and measuring the intensity of its reflected light on the time base; and an optical adding and dividing device 22 for directing the signal light which has been transmitted through the optical fiber line 10 to incident on the optical receiving apparatus 18, directing the probe light outputted by the optical pulse tester 20 to also incident on the optical fiber line 10, and inputting the light reflected on the optical fiber line 10 into the optical pulse tester 20.

Wavelengths $\lambda 0$, $\lambda 1$ of probe lights generated by the pulse testers 14, 20 are made different from the wavelength $\lambda s$ of the signal transmission light. In the case of a wavelength-division multiplexing transmission system, the wavelength $\lambda s$ of the signal transmission light means a waveband consists of a plurality of wavelengths.

The optical fiber grating 10a on the optical fiber line 10 should be placed at a position which can be recognized as a target, such as a connecting point of the optical fiber and the like. For example, a closure for enveloping therein a point of fusion connection is desirable. A suitable reflective index of the optical fiber grating 10a is in the order of 1%~10%. Further, the optical fiber grating 10a may be formed in advance at an extra portion of the optical fiber to be used for fusion connection, so that the number of connecting points may be reduced, thereby to improve a transmission loss. Since the reflecting wavelength $\lambda 1$ of the optical fiber grating 10a is different from the signal transmission light wavelength (or waveband) $\lambda s$, the optical fiber grating 10a does not attenuate the signal transmission light, so that a fault location can be measured even during transmission (in-service).

Now, the operation of this embodiment will be described. The optical sending apparatus 12 generates a signal light, and the signal light is input into the optical fiber line 10 through the optical adding and dividing device 16 and transmitted through the optical fiber line 10. Since the wavelength $\lambda s$ of the signal light is different from the reflecting wavelength $\lambda 1$ of the optical fiber grating 10a, the signal light is not reflected by the optical fiber grating 10a, and thereby not attenuated during the transmission of the optical fiber line 10. The signal light outputted from the optical fiber line 10 is input into the optical receiving apparatus 18 through the optical adding and dividing device 22 of the receiving station B, and subjected to signal receiving process.

The optical pulse tester 14 outputs probe pulse lights of wavelengths λ0, λ1 at slightly different times. Of course, the probe pulse lights of wavelengths λ0, λ1 may be outputted at the same time, but in that case it is necessary to provide the optical pulse tester 14 with an optical separation element for separating the reflecting light of the wavelength λ0 from the reflecting light of the wavelength λ1, light receiving elements for receiving the separated lights discretely, and a signal processing circuit for processing the output signal from each of the light receiving elements.

The probe pulse light of the wavelength λ1 outputted from the optical pulse tester 14 is input into the optical fiber line 10 through the optical adding and dividing device 16, and transmitted through the optical fiber line 10. During transmission through the optical fiber line 10, the probe pulse light of the wavelength λ1 is partially reflected by the optical fiber grating 10a, and, thereby, attenuated. The reflected light from each optical fiber grating 10a and the Rayleigh back-scattered light of the optical fiber line 10 will travel in a reverse direction towards the sending station A, and input into the optical pulse tester 14 through the optical adding and dividing device 16. The optical pulse tester 14 indicates the reflecting light inputted thereinto in a graphic representation (and/or a printed output) wherein a vertical axis is the intensity of reflecting light and a lateral axis is a time base.

The probe pulse light of the wavelength λ0 outputted from the optical pulse tester 14 is input into the optical fiber line 10 through the optical adding and dividing device 16 and transmitted through the optical fiber line 10. However, the probe pulse light of the wavelength X0 is not reflected by the optical fiber grating 10a. Consequently, only the reflected light of the Rayleigh back-scattered light of the optical fiber line 10 travels in the reverse direction through the optical fiber line 10 towards the sending station A through the optical adding and dividing device 16. As same as in the case of the probe pulse light of the wavelength λ1, the optical pulse tester 14 indicates the inputted reflecting light in a graphic representation (and/or printed output) wherein the vertical axis is the intensity of the reflecting light, and the lateral axis is the time base.

A result of measurement by the probe pulse light of λ1 and a result of measurement by the probe pulse light of λ0 are described in a monitor screen (or in a printed sheet) side by side on the same time base. In this manner, as will be described hereinbelow, a fault location can be detected with a higher precision.

The inspection by the optical pulse tester 20 is conducted in the same manner as the optical pulse tester 14.

Figure 2:
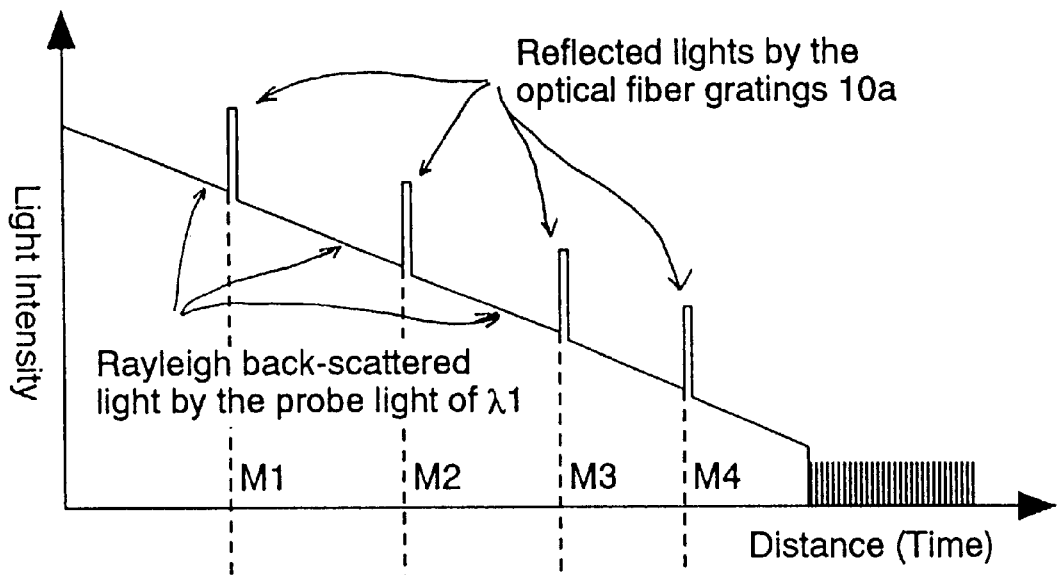
FIG. 2 shows results of measurements by optical pulse testers 14, 20.
Figure 2:
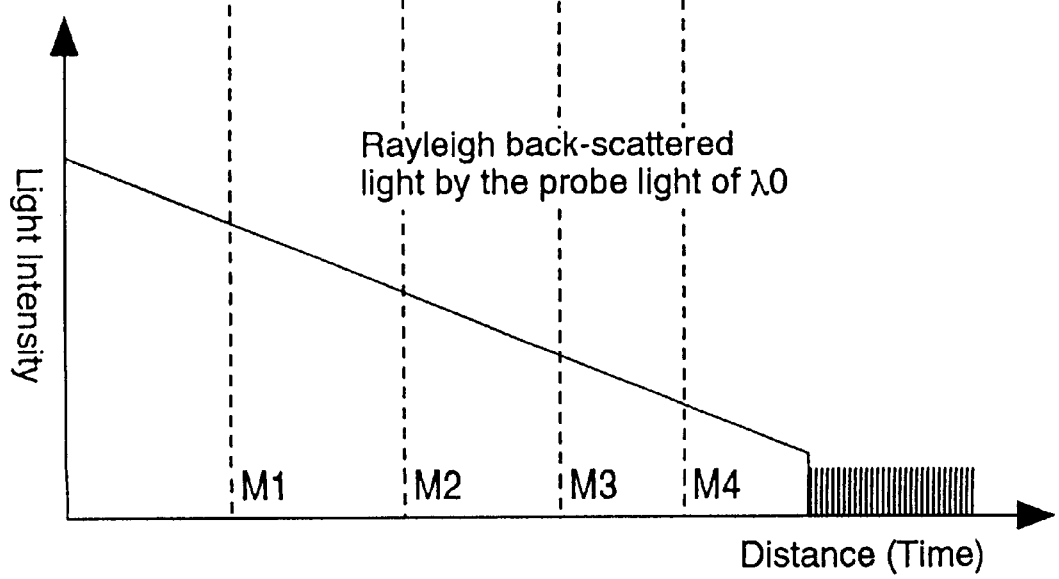

FIG. 2 shows the respective results of measurements by the optical pulse tester 14 and 20. FIG. 2(1) shows an example of measurement by the probe light of the wavelength λ1, and FIG. 2(2) shows an example of measurement by the probe light of the wavelength λ0. In both examples, the lateral axis is a distance (the time lapsed after output of the probe light), and the vertical axis is the intensity of the reflecting light.

As shown in FIG. 2(1), the probe light of the wavelength λ1 is reflected by the optical fiber grating 10a, and, consequently, the intensity of the reflecting light becomes stronger at each position where the optical fiber grating 10a is present. Since the positions of the optical fiber gratings 10a are known, the positions at which the intensity of the reflecting light becomes stronger are denoted as markers M1~M4. On the other hand, as shown in FIG. 2(2), the probe light of the wavelength λ0 is not reflected by the optical fiber grating 10a, and the intensity of the reflecting light reflects the state of the optical fiber line 10, and normally, the light intensity is attenuated in accordance with a distance, and becoming stronger at the fault location in response to a degree of the fault.

The fault location can be detected even with only the wavelength λ1. However, to facilitate the distinction between the reflection by the optical fiber grating 10a and the reflection by cracking or fracture, it is preferable to measure the fault location also with the wavelength λ0 which is different from the reflecting wavelength λ1 of the optical fiber grating 10a.

By comparing the position (time), at which the reflected light intensity of the probe light of the wavelength λ0 becomes stronger, with the positions (times) of markers M1~M4 of the reflected light of the probe light of the wavelength λ1, the fault location can be determined with a high precision. Since the positions of markers M1~M4 are known, obtaining a distance from the nearby marker makes an error in distance smaller.

In the case where the optical pulse testers 14, 20 have a function of automatically calculating a distance to the fault location, it is preferable that the positions of markers M1~M4, i.e. the positions where the optical fiber gratings 10a are placed can be input into the testers. With the inputted markers positions, the position of the fault location (a distance to the fault location) can be calculated with a higher precision than that of the conventional art.

Figure 3:
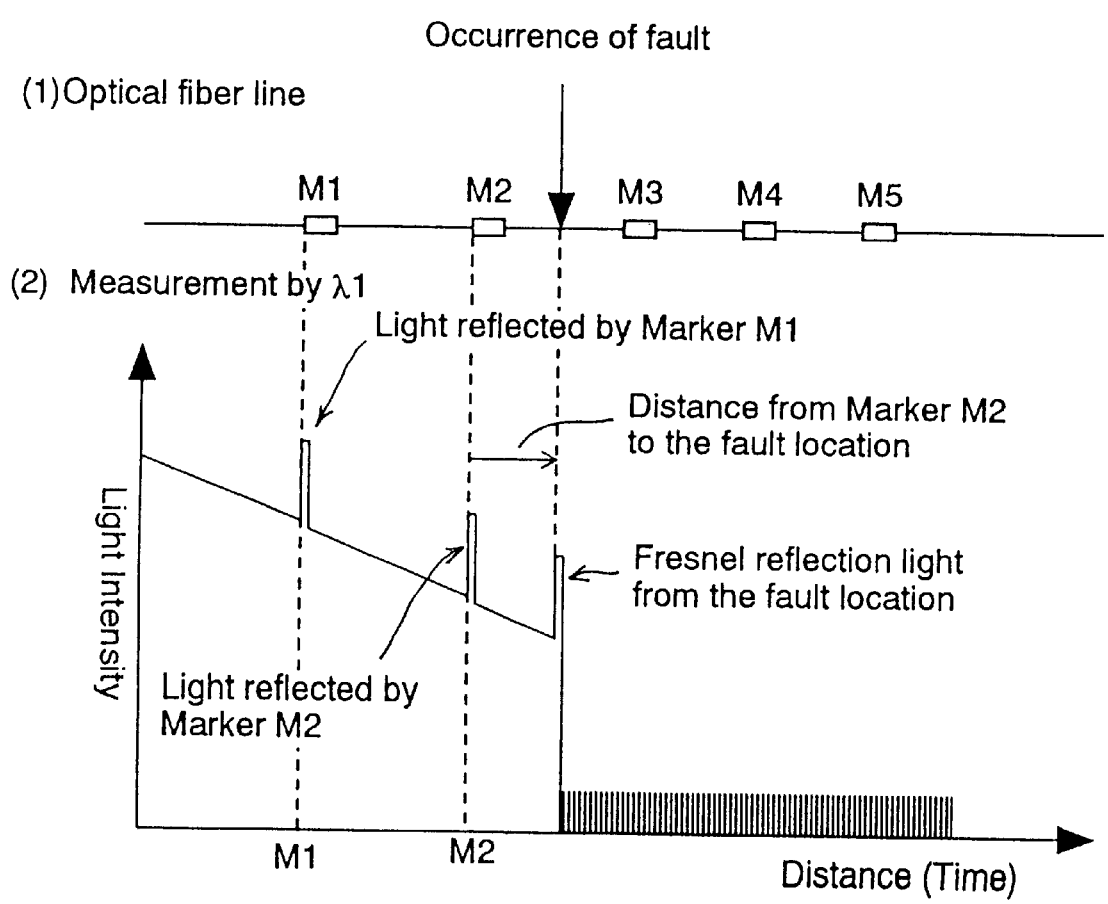
FIG. 3 shows an example of measurement of this embodiment showing a case where a fault has occurred between markers M2 and M3.

FIG. 3 shows a measurement example of this embodiment where a trouble has occurred between the markers M2 and M3. FIG. 3(1) shows the positions of the markers M1~M5, and FIG. 3(2) shows a waveform as a result of measurement by the probe pulse light of the wavelength λ1. Each marker of M1~M5 comprises a reflecting element for reflecting the wavelength λ1. The Fresnel reflection is produced at the fault location, and calculation of a distance between the nearest marker M2 and the Fresnel reflecting light allows determination of the fault location with a high precision. In this case, the fault location can be measured with a high precision solely with the wavelength λ1.

Figure 4:
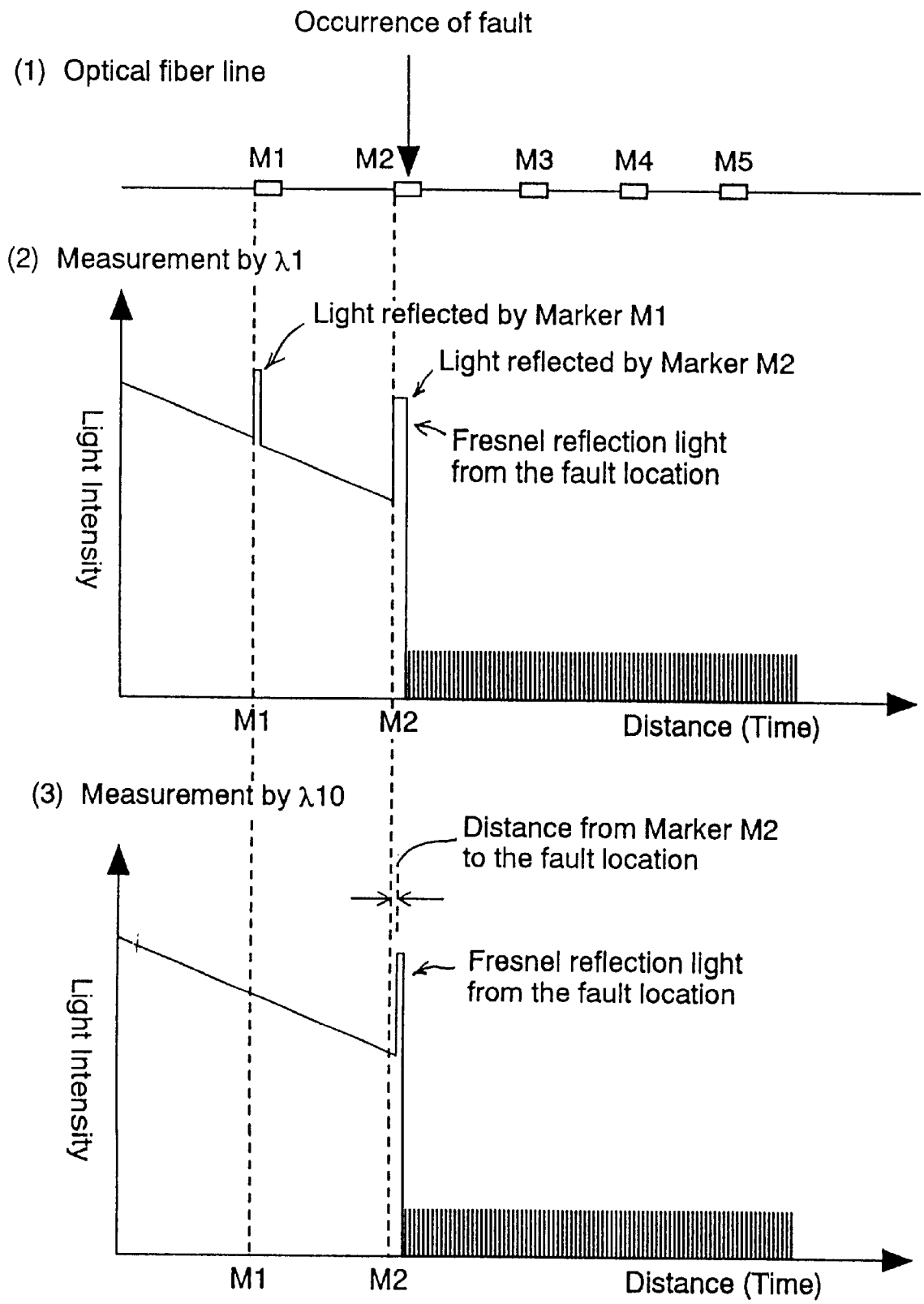
FIG. 4 shows an example of measurement of this embodiment showing a case where a fault has occurred at a position superimposing the marker M2 or extremely adjacent thereto.

FIG. 4 shows another measurement example of this embodiment where a trouble has occurred at the marker M2 superimposed thereon or at a location extremely close to the marker 2. FIG. 4(1) shows the positions of markers M1~M5; FIG. 4(2) shows a waveform as a result of measurement made by the probe pulse light of the wavelength λ1; and FIG. 4(3) shows a waveform as a result of measurement made by the probe pulse light of the wavelength λ0. With the measurement by the probe pulse light of the wavelength λ1, the reflecting light from the marker M2 and the Fresnel reflecting light from the fault location are, as sown in FIG. 4(2), substantially superimposed one upon the other, and they cannot be distinguished from each other. However, with the measurement by the probe pulse light of the wavelength λ0, there are no reflecting lights from any of the markers M1~M5, as shown in FIG. 4(3), and consequently, the Fresnel reflecting light from the troubled point is conspicuous, and, therefore, the fault location can be identified. Comparison of the measurement by the probe pulse light of the wavelength λ0 with that of the wavelength λ1 allows to identify whether the reflecting light is from the fault location or any of the markers M1~M5, so that the fault location can be determined with high precision.

Figure 5:
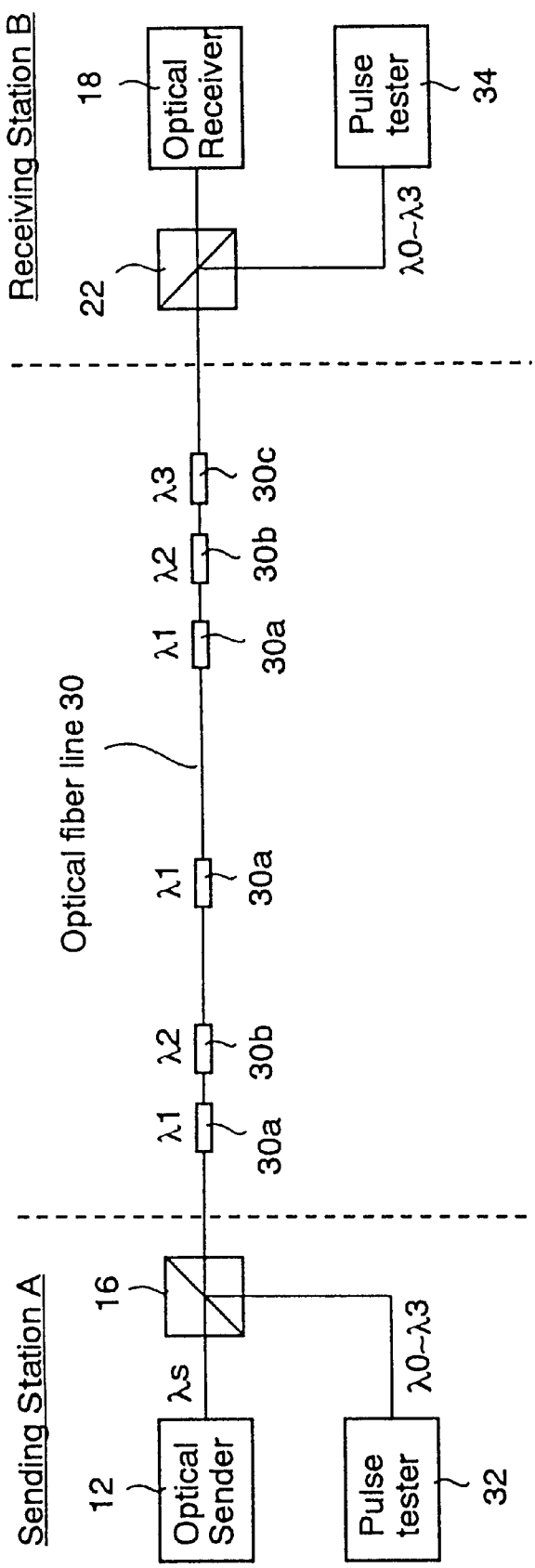
FIG. 5 shows a schematic structural block diagram of a second embodiment of this invention.

A plurality of reflecting elements for reflecting different wavelengths may be disposed on the optical fiber line. FIG. 5 shows a schematic structural block diagram of such embodiment. On an optical fiber line 30 extending between the sending station A and the receiving station B, a plurality of optical fiber gratings 30a, 30a, 30a for reflecting the wavelength λ1; a plurality of optical fiber gratings 30b and 30b for reflecting the wavelength λ2; and an optical fiber grating 30c for reflecting the wavelength λ3 are arranged at suitable positions and intervals.

At the sending station A, an optical pulse tester 32, which generates the probe pulse lights of wavelengths λ0, λ1, λ2, λ3 and measures the intensity of the reflected lights on the time base, is arranged in place of the optical pulse tester 14; and at the receiving station B, an optical pulse tester 34, which generates, like the optical pulse tester 32, the probe pulse lights of wavelengths λ0, λ1, λ2, λ3 and measures the intensity of the reflecting lights on the time base, is arranged in place of the optical pulse tester 20.

The wavelengths λ0, λ1, λ2, λ3 of the probe lights generated by the optical pulse testers 32, 34 are different from the wavelength λs of the signal transmission light. In the case of the wavelength-division multiplexing system, the wavelength λs of the signal transmission light means the waveband consisting of a plurality of wavelengths.

In the embodiment of FIG. 5, too, the optical fiber gratings 30a, 30b, 30c should be placed at positions which can be recognized as target points, such as connecting points of the optical fiber and the like. By placing the optical fiber gratings 30a, 30b, 30c of different reflecting wavelengths adjacent to one another, for example, at a distance of about 10 m, precision of each marker can become higher, and, as a result, precision of detecting the fault location also becomes higher. Preferably, each optical fiber grating 30a, 30b, 30c is placed, for example, in a closure for enveloping therein a point of fusion connection. A suitable reflective index of each of optical fiber gratings 30a, 30b, 30c is in the order of 1%~10%. Further, the optical fiber gratings 30a, 30b, 30c may be formed in advance at an extra portion of the optical fiber to be used for fusion connection of fibers, so that the number of connecting points may be reduced, thereby to improve a transmission loss.

With the reflecting wavelengths λ1~λ3 of the optical fiber gratings 30a, 30b, 30c being different from the signal transmission light wavelength (or waveband) λs, the optical fiber gratings 30a, 30b, 30c do not make attenuation of the signal transmission light, thereby the fault location can be measured even during transmission (in-service).

Now, the operation of the embodiment of FIG. 5 will be described. The operation regarding transmission of signal light is the same as the embodiment of FIG. 1, since the optical fiber gratings 30a, 30b, 30c on the optical fiber line 30 do not reflect the wavelength λs of the signal light.

The optical pulse tester 32 generates probe pulse lights of wavelengths λ0, λ1, λ2, λ3 at slightly different times. Of course, the probe pulse lights of wavelengths λ0~λ3 may be outputted at the same time, but in that case it is necessary to provide the optical pulse tester 32 with an optical separation element for separating the reflecting lights of the wavelengths λ0~λ3 from one another and light receiving elements for receiving the separated lights discretely.

The probe pulse light of the wavelength λ1 outputted from the optical pulse tester 32 is input into the optical fiber line 30 through the optical adding and dividing device 16, and transmitted through the optical fiber line 30. During transmission through the optical fiber line 30, the probe pulse light of the wavelength λ1 is partially reflected by the optical fiber grating 30a, and, thereby, attenuated. The reflecting light from each optical fiber grating 30a and the Rayleigh back-scattered light of the optical fiber line 30 will travel in the reverse direction through the optical fiber line 30 towards the sending station A, and input into the optical pulse tester 32 through the optical adding and dividing device 16. The optical pulse tester 32 indicates the reflected light inputted thereinto in a graphic representation (and/or a printed output) wherein a vertical axis is the intensity of reflecting light and a lateral axis is a time base.

The probe lights of wavelengths λ2, λ3 respectively outputted from the optical pulse tester 32 are processed basically the same as the probe light of the wavelength λ1. However, the probe light of the wavelength λ2 is reflected by the optical fiber grating 30b, and the probe light of the wavelength λ3 is reflected by the optical fiber grating 30c. Then, time characteristics (i.e. distance characteristics) of the intensity of these reflected lights are indicated in a graphic representation on a monitor screen and/or in a printed output.

The probe pulse light of the wavelength λ0 outputted from the optical pulse tester 32 is input into the optical fiber line 30 through the optical adding and dividing device 16 and transmitted through the optical fiber line 30. However, the probe pulse light of the wavelength λ0 is not reflected by any of the optical fiber gratings 30a, 30b, 30c. Consequently, only the reflected light of the Rayleigh back-scattered light of the optical fiber line 30 travels in the reverse direction through the optical fiber line 30 towards the sending station A and input into the optical pulse tester 32 through the optical adding and dividing device 16. The optical pulse tester 32 displays time characteristics (i.e. distance characteristics) of the intensity of reflected light in a graphic representation on the screen of a monitor (and/or in a printed output).

Figure 6:
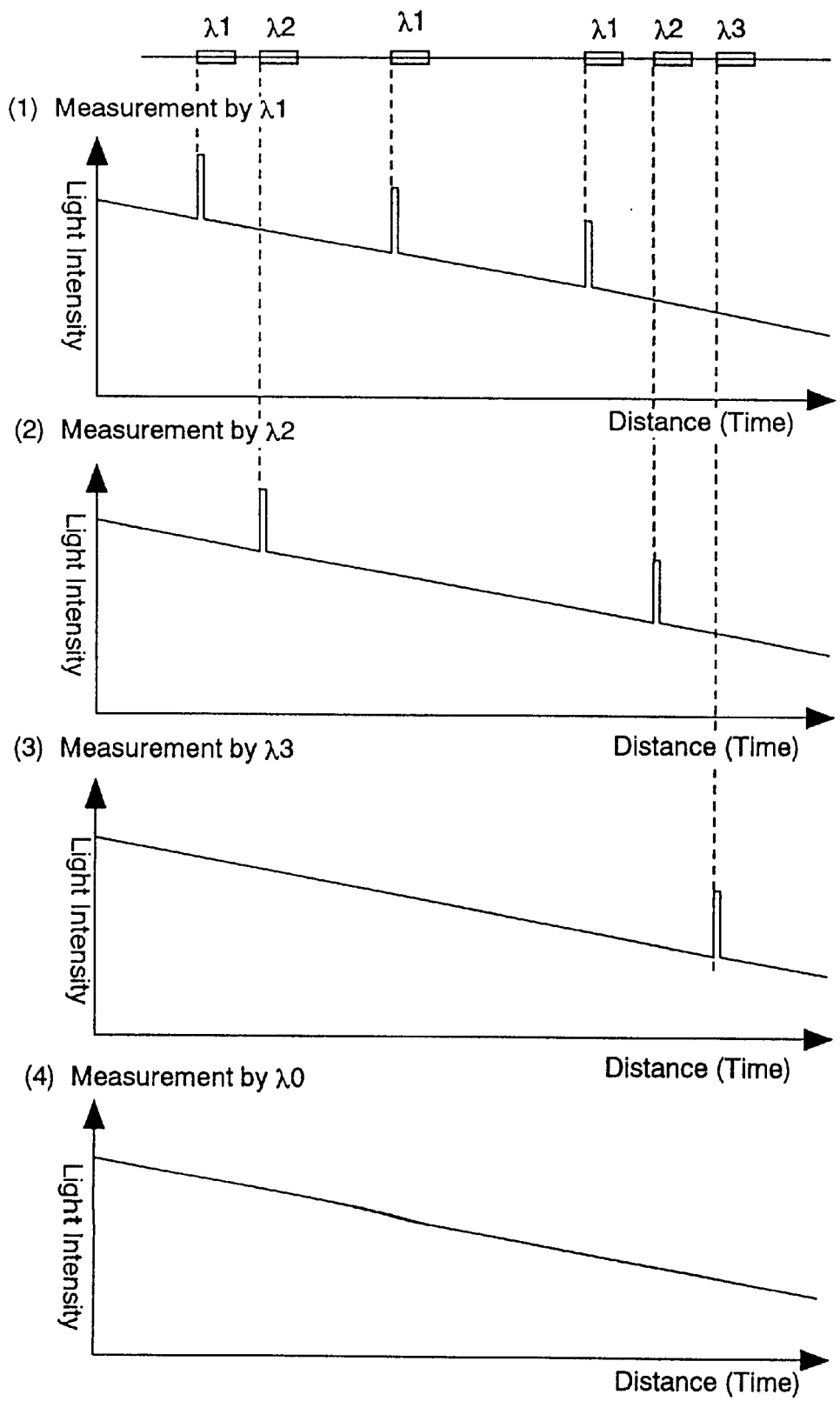
FIG. 6 shows a result of measurement of the second embodiment.

Thus, the positions of the optical fiber gratings 30a, 30a, 30a can be measured by the probe light of the wavelength λ1; the positions of the optical fiber gratings 30b, 30b can be measured by the probe light of the wavelength λ2; and the position of the optical fiber grating 30c can be measured by the probe light of the wavelength λ3. These measured positions serve as markers, that is, reference positions in measuring position of a fault location by the probe light of λ0. Examples of measurements by the probe lights of λ0, λ1, λ2, λ3 are shown in FIG. 6. FIG. 6(1) is an example of result of measurement by λ1; FIG. 6(2) is an example of result of measurement by λ2; FIG. (3) is an example of measurement by λ3; and FIG. (4) is an example of measurement by λ0. In all these examples, the vertical axis is the intensity of reflected light, and the lateral axis is the distance (time).

It is preferable that the results of measurements by the probe lights of wavelengths λ0, λ1, λ2, λ3, are indicated on the same monitor screen, or on the same sheet of paper, described side by side on the same time base. In this manner, comparison between the marker position and the fault location, as well as calculation of a distance to the fault location, can be made easier. In the case where the optical pulse testers 32, 34 have a function of automatically calculating a distance to the fault location, it is preferable that the positions of markers i.e. the positions of the optical fiber gratings 30a, 30b, 30c can be input into the testers. With the inputted marker positions, the position of the fault location (or a distance to the fault location) can be calculated with a higher precision than that of the conventional art.

In the embodiment of FIG. 5, it is apparent that an optical fiber grating which can reflect a plurality of wavelengths (for example, $\lambda 1$ and $\lambda 2$) may be used.

The embodiment of FIG. 5 is particularly effective for such a case, for example, where it is desirable to insert the optical fiber gratings 30a~30c, which serve as the reflecting elements, considerably adjacent to one another. In this case, the optical fiber gratings 30a~30c can be separated from one another by changing the wavelengths, without narrowing a pulse width of the probe lights generated by the optical pulse testers 32, 34. A measuring dynamic range of the optical pulse testers 32, 34 relies upon a pulse width of the probe light, and the narrower the pulse width, the higher the resolving power of a distance, but the measuring dynamic range becomes smaller. Therefore, this embodiment is particularly effective when the target position to be measured is far away from the end of measuring section, and, consequently, the measuring dynamic range should be made larger, namely, it is effective particularly for the optical fiber line of a super long distance.

Figure 7:
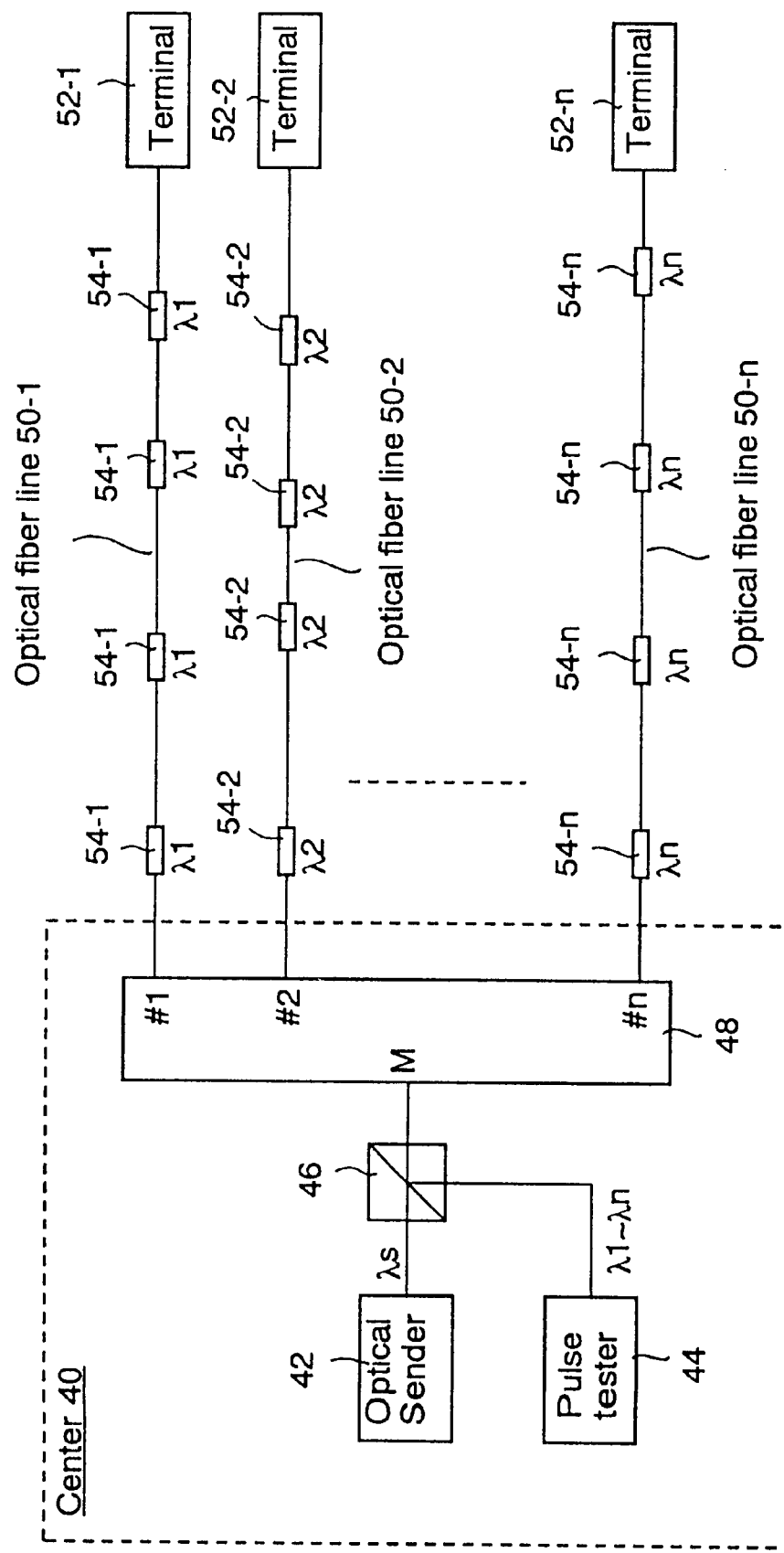
FIG. 7 is a schematic structural block diagram of a third embodiment.

FIG. 7 is a schematic structural block diagram of an embodiment applied for an optical fiber communication system wherein the output light from the optical sending apparatus are multi-divided by an optical adding and dividing device and distributed to a plurality of terminals. A central station 40 comprises an optical sending apparatus 42 for generating the signal light of the wavelength $\lambda s$; an optical pulse tester 44 for generating probe pulse lights of wavelengths $\lambda 1 \sim \lambda n$ and measuring the reflected lights on the time base; an optical adding and dividing device 46 for adding the output light of the optical sending apparatus 42 and the output lights (probe lights) of the optical pulse tester 44, and returning the reflected lights of the probe lights to the optical pulse tester 44; and an optical adding and dividing device 48 for dividing the added output lights of the optical sending apparatus 42 and the optical pulse tester 44, which have been output from the optical adding and dividing device 46, and distributing the divided lights to optical fiber lines 50-1~50-n of an n channels. The optical adding and dividing device 48 also has a function of adding the reflected lights from the optical fiber lines 50-1~50-n and returns the added lights to the optical adding and dividing device 46. Input/output characteristics of the optical adding and dividing device 48 do not rely upon wavelengths. Opposite ends of the optical fiber lines 50-1~50-n of the n channels are connected to optical receiving terminals 52-1~52-n, respectively.

On each of the optical fiber lines 50-1~50-n of the n channels, reflecting elements (each comprising, for example, an optical fiber grating as described in each of the above-described embodiments) 54-1, 54-2, . . . 54-n for reflecting the wavelengths $\lambda 1, \lambda 2 \ldots \lambda n$ at a reflective index in the order of 1%~10% are disposed at suitable locations. Preferable locations of these reflecting elements are the same as described in each of the foregoing embodiments. The reflecting wavelengths $\lambda 1 \sim \lambda n$ of the reflecting elements 54-1~54-n are set differently from the wavelength $\lambda s$ of the signal light.

Now, the operation of the embodiment shown in FIG. 7 will be described. The signal light of the wavelength $\lambda s$ outputted from the optical sending apparatus 42 of the central station 40 is input into an M port of the optical adding and dividing device 48 through the optical adding and dividing device 46, and is divided into n to be outputted to each optical fiber line 50-1~50-n from each port #1~#n of the optical adding and dividing device 48. The signal light transmitted through each optical fiber line 50-1~50-n is input into each terminal 52-1~52-n where the signal light is received and processed.

The optical pulse tester 44 outputs the probe pulse lights of the wavelengths $\lambda 1 \sim \lambda n$ at slightly different times successively, for example, in the sequence of $\lambda 1, \lambda 2, \ldots \lambda n$. The output light from the optical pulse tester 44 is input into the M port of the optical adding and dividing device 48 through the optical adding and dividing device 46. The optical adding and dividing device 48 divides the probe lights into the n, like the dividing of the signal light wavelength $\lambda s$, and each divided probe light is input into each optical fiber line 54-1~54-n from each port #1~#n.

In the optical fiber line 50-1, the probe light of the wavelength $\lambda 1$ is partially reflected by the reflecting element 54-1 during propagation, while the remaining wavelengths $\lambda 2 \sim \lambda n$ are not reflected by the reflecting element 54-1 and propagated through the optical fiber line 50-1. Consequently, the reflected light of the wavelength $\lambda 1$ from the reflecting element 54-1 and the reflected lights of the wavelengths $\lambda 1 \sim \lambda n$ by the Rayleigh back-scattering are propagated through the optical fiber line 50-1 towards the central station 40. Similarly, in the optical fiber line 50-2, the probe light of the wavelength $\lambda 2$ is reflected by the reflecting element 54-2; and in the optical fiber 50-n, the probe light of the wavelength $\lambda n$ is reflected by the reflecting element 54-n.

The reflected lights which return through the optical fiber lines 50-1~50-n are added by the optical adding and dividing device 48 and input into the optical pulse tester 44 through the optical adding and dividing device 46. In the optical pulse tester 44, the intensity of the reflected lights are analyzed (including graphic representation in the monitor screen and/or in printed output form) by each wavelength on the time base.

In the embodiment of FIG. 7, since the reflected lights transmitted through each optical fiber line 50-1~50-n are returned to the optical pulse tester 44 in the superimposed state, a minute trouble which might have occurred in any optical fiber line 50-1~50-n cannot be measured precisely by the Raleigh back-scattered light. However, In the case of cracking or rupture, there will be the reflected pulse from that cracking or rupture, and the reflected lights from any of the reflecting elements 54-1~54-n located behind such cracking or ruptured position will not be present or will be weaker than the normal intensity, and, as a result, any of the optical fiber lines 50-1~50-n having such cracking or rupture occurred can be specified and an approximate position thereof can be measured by the wavelengths $\lambda 1 \sim \lambda n$ of the probe lights. For example, with the probe light of the wavelength $\lambda 1$, the optical fiber line 50-1 can be checked as to whether there is a cracking or rupture and, if any, an approximate position thereof can be measured; and with the probe light of the wavelength $\lambda n$, the optical fiber line 50-n can be checked as to whether there is a cracking or rupture and, if any, an approximate position thereof can be measured.

Figure 8:
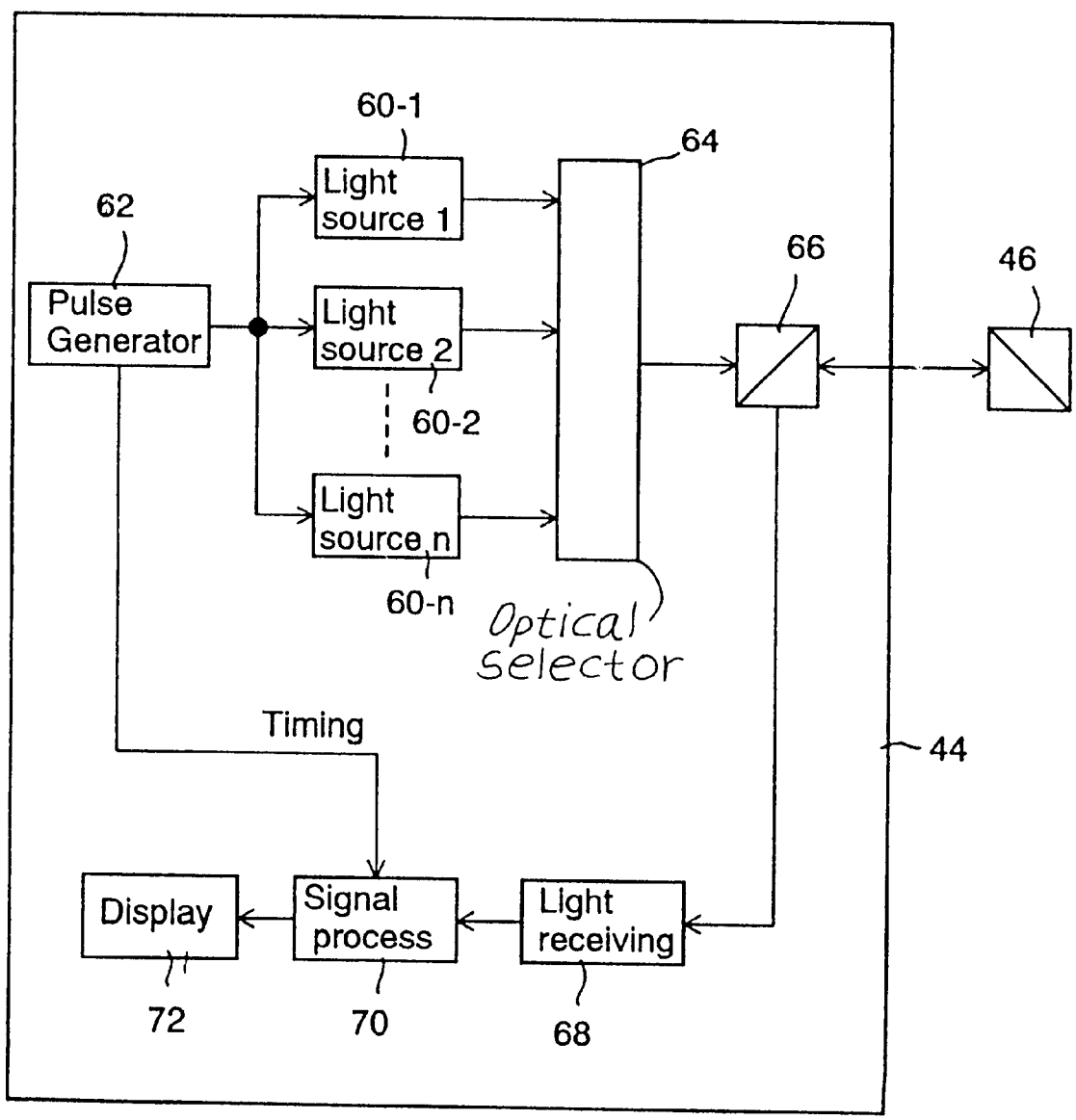
FIG. 8 is a schematic structural block diagram of an optical pulse tester 44.
Figure 9:
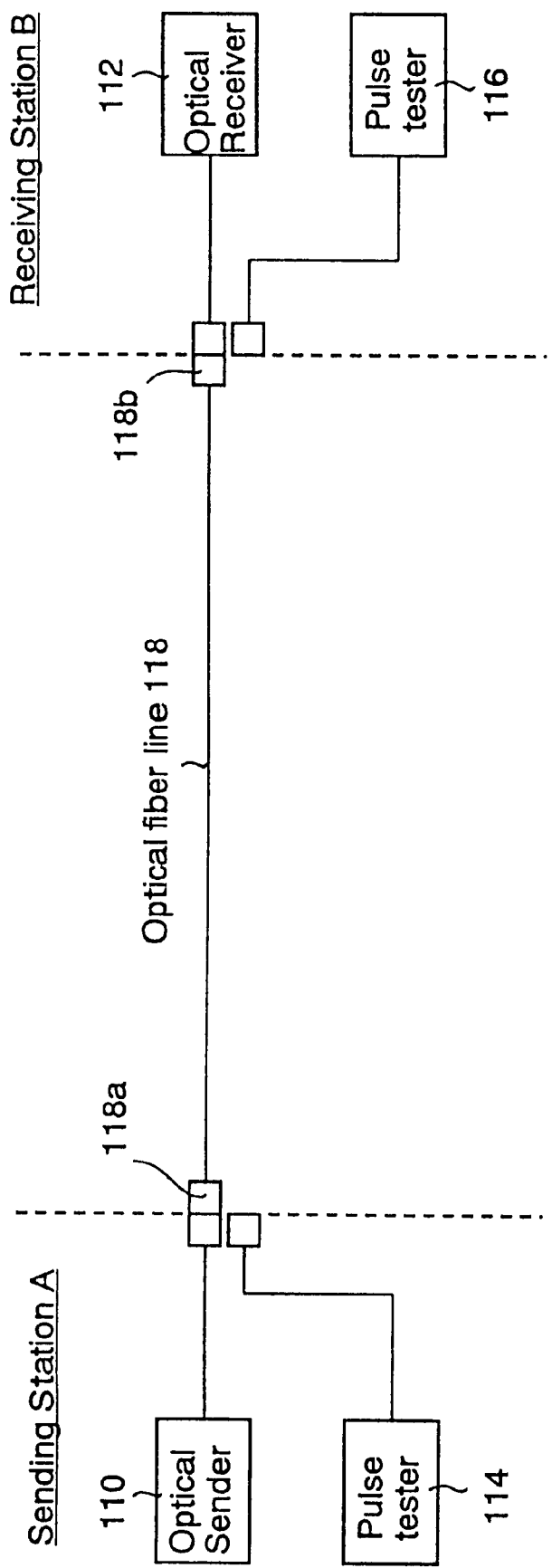
FIG. 9 is a schematic structural block diagram of a first conventional art.
Figure 10:
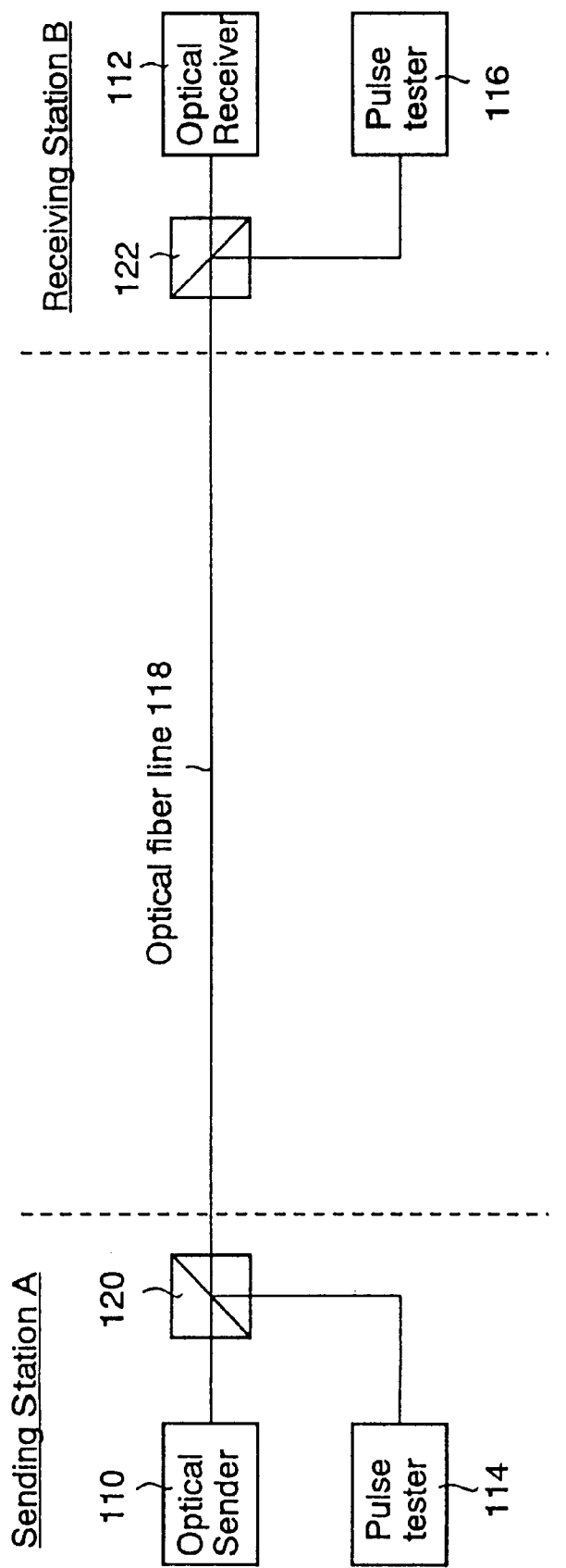
FIG. 10 is a schematic structural block diagram of a second conventional art.
Figure 11:
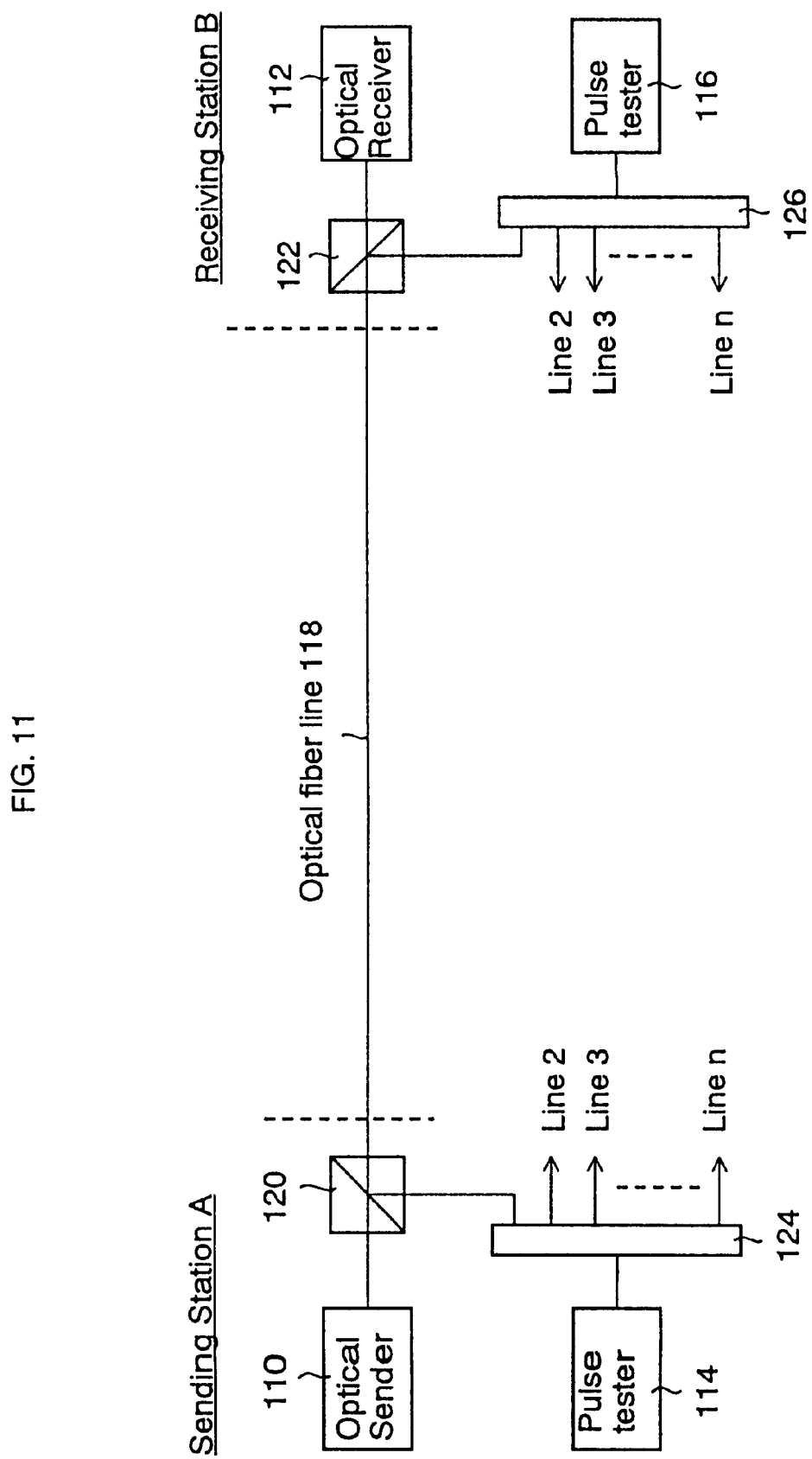
FIG. 11 is a schematic structural block diagram of a third conventional art.

FIG. 8 is a schematic structural block diagram of the optical pulse tester 44 of FIG. 7. Numerals 60-1, 60-2, . . . 60-n are each designates a light source (a laser diode) for respectively generating laser beams of wavelengths $\lambda 1, \lambda 2, \ldots, \lambda n$, and they are driven by a driving pulse generated by a pulse generator 62 to generate optical pulses (probe lights) of the above-mentioned wavelengths, respectively. An optical selector 64 selects the output lights from the light source 60-1~60-n successively at a predetermined timing, and supplies it to an optical adding and dividing device 66.

The optical adding and dividing device 66 outputs the probe lights from the optical selector 64 to outside (here, to the optical adding and dividing device 46), and supplies the reflected light from the outside (here, from the optical adding and dividing device 46) to a light receiving device 68. The light receiving device 68 converts the optical signal into an electrical signal, and outputs the electric signals to a signal processing circuit 70. The signal processing circuit 70 starts processing (for example, a logarithmic compression) of an output level of the light receiving device 68 with a timing signal from the pulse generator 62 as a reference, on the time base. Thus, a variation of the intensity of reflected light can be measured on the time base (i.e. distance), and a result is indicated on the screen of a display device 72.

It is apparent that, in place of the plurality of light sources 60-1~60-n of different wavelengths and the optical selector 64, a variable wavelength light source may be used. Further, instead of making direct pulse driving of the light source, optical pulses may be formed by an optical switch, such as acoustic-optical(AO) switch.

The embodiment of FIG. 7 is suitable, for example, for an optical network of broadcasting system, such as, cable televisions, since a fault location of optical fiber lines, which have been multi-branched by a star coupler, can be measured by centering thereto from the distributing station. In this case, reflecting elements of different wavelengths are disposed respectively per branch line at desired locations on each branched fiber line, so that the branch line having the fault can be specified by the distributing station according to the wavelength, and the fault location can be determined by the reflecting time.

Figure 12:
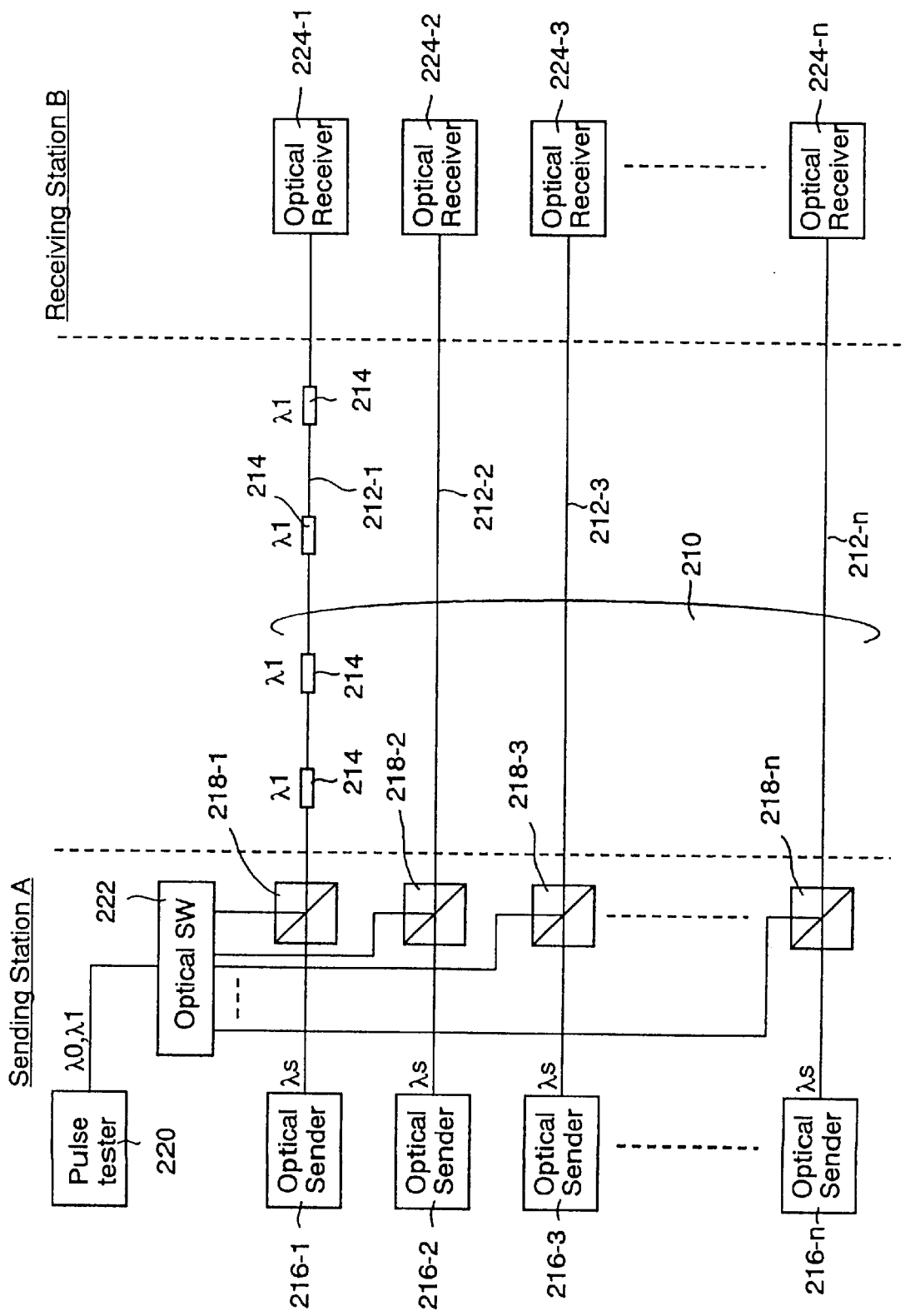
FIG. 12 is a schematic structural block diagram of a fourth embodiment of this invention applied for the optical fiber cable.

Generally, an optical fiber cable envelopes therein a plurality of, for example, more than 12 optical fiber lines. In this case, therefore, incorporating the above-mentioned reflecting elements 10a, 30a, 30b, 30c in one optical fiber line and making it a distance reference, thereby, the fault location on any/all optical fiber lines enclosed in the fiber cable can be detected with high precision, because the lengths of all optical fiber lines enclosed in the optical fiber cable are the same. FIG. 12 is a schematic structural block diagram of this embodiment.

The sending station A and the receiving station B are connected by an optical fiber cable 210, and the optical fiber cable 210 encloses therein the n number of optical fiber lines 212-1~212-n. One optical fiber line 212-1 includes optical fiber gratings 214, 214 for reflecting the wavelength $\lambda 1$ which is different from the signal wavelength$\lambda s$, and disposed at appropriate locations with suitable intervals, like the optical fiber line 10 of FIG. 1, and to serve as the optical fiber line of a distance reference. The location of optical fiber grating 214 and its reflective index are the same as the optical fiber grating 10a of the above-described embodiment. Also, like the embodiment of FIG. 5, a plurality of optical fiber gratings of different wavelengths may be provided.

The sending station A includes an optical sending apparatus 216-1~216-n for generating the signal transmission light of the wavelength $\lambda s$ to each optical fiber line 212-1~212-n, and the output light from each optical sending apparatus 216-1~216-n is applied to each optical fiber line 212-1~212-n through an optical adding and dividing device 218-1~218-n.

The sending station A further includes an optical pulse tester 220 for generating probe pulse lights of wavelength $\lambda 0, \lambda 1$ which are different from the optical signal wavelength $\lambda s$, and measuring the intensity of their reflected lights on the time base; and an optical switch 222 for connecting the output probe pulse light of the optical pulse tester 220 with one of the optical fiber lines 212-1~212-n. The optical switch 222 has the n number of selecting terminals which are respectively connected with the optical adding and dividing device 218-1~218-n.

The optical adding and dividing device 218-1~218-n serves as a half mirror in terms of its function, like the optical adding and dividing device 16 of FIG. 1; and they respectively direct the output lights of the optical sending apparatuses 216-1~216-n to incident upon the optical fiber lines 212-1~212-n, direct the probe pulse lights, which have been incident thereon from the optical pulse tester 220 through the optical switch 222, to incident upon the optical fiber lines 212-1~212-n, and supply the reflected lights from the optical fiber lines 212-1~212-n to the optical switch 222. The optical switch 222 supplies the reflected light, which has been received from one of the optical adding and dividing devices 218-1~218-n connected with the selected terminal, to the optical pulse tester 220.

The receiving station B includes optical receiving apparatuses 224-1~224-n for receiving optical signals which have been transmitted through each of the optical fiber lines 212-1~212-n of the optical fiber cable 210. Of course, the receiving station B may be provided with similar apparatuses of the sending station A, such as the optical adding and dividing device 218-1~218-n, optical pulse tester 220 and optical switch 222, so that whether there is a fault on the optical cable 210, and if so, can measure the fault location from an optical receiving station B.

In the case where the optical fiber line 212-1 is used exclusively as the distance reference, the optical sending apparatus 216-1, the optical adding and dividing device 218-1 and the optical receiving apparatus 224-1 are, of course, not required. In this case, the corresponding selecting terminal of the optical switch 222 is directly connected with the optical fiber line 212-1.

Wavelengths $\lambda 0, \lambda 1$ of the probe lights generated by the pulse tester 220 are made different from the signal transmission wavelength $\lambda s$. Needless to say, in the case of wavelength-division multiplexing system, the signal transmission wavelength $\lambda s$ means a waveband consisting of a plurality of wavelengths. In the case of this embodiment, it may be possible to have the probe pulse light of only the wavelength $\lambda 1$. However, the probe pulse light of the wavelength $\lambda 0$ is helpful to identify the position of the optical fiber grating 214 of the optical fiber line 212-1 serving as the distance reference, or to determine a fault location adjacent to the optical fiber grating 214.

The operation of this embodiment will be described. Each optical sending apparatus 216-1~216-n generates the signal light, and the signal light is input into each optical fiber line 212-1~212-n through each optical adding and dividing device 218-1~218-n and transmitted through each optical fiber line 212-1~212-n. Each optical receiving apparatus 224-1~224-n of the receiving station B receives and processes the signal light which has been transmitted through each optical fiber line 212-1~212-n.

Each optical fiber line 212-1~212-n of the optical fiber cable 210 is checked at the time when a fault has occurred, or continuously by the optical pulse tester 220 to see whether there is a fault or not, and if so, the fault location can be measured. Generally, an administrator of the optical fiber cable 210 makes the optical pulse tester 220 generate the probe pulse light of the wavelength $\lambda 1$, and the optical switch 222 switch the probe light successively to each optical fiber line 212-1~212-n to check these optical fiber lines in sequence. From the reflected light of the optical fiber line 212-1, many distance markers (and Fresnel reflection pulse), can be obtained as shown in FIG. 2(1), as in the case of each of the above-described embodiments. From the remaining optical fiber lines 212-2~212-n, time variations of the Rayleigh back-scattered light and Fresnel light reflected from the fault location can be obtained. By comparing a result of measurement of the optical fiber line 212-1 with a result of measurement of each optical fiber line 212-2~212-n, the fault location in any of the optical fiber lines 212-2~212-n can be determined with a higher precision.

When the measuring position of the optical fiber grating 214 of the optical fiber line 212-1 is questionable, the probe pulse light of the wavelength $\lambda 0$ is generated by the optical tester 220 to check the optical fiber line 212-1 with the wavelength $\lambda 0$. The operation of this checking is exactly the same as the embodiment of FIG. 1. Therefore, with the embodiment of FIG. 12, it is possible to have the optical pulse tester 220 generate the probe pulse light of only the wavelength $\lambda 1$.

When intervals for placing reflecting elements of optical fiber gratings are set to, for example, every 10 km, an error in the displayed distance is made to about 34 m, even with the optical fiber lines of 100 km in length. An error may be made smaller by increasing the number of positions for placing the reflecting elements. This allows determination of the fault location with a high precision and, therefore, allows reduction of the time required for restoration to a considerable extent. Further, for a zone which is thought to have a higher potentiality for having a fault, the reflecting elements may be placed at both ends of the zone, thereby to facilitate detection of the fault location.

Those skilled in the art will be understood from the foregoing description that the invention can measure the position of a fault location with high precision and the time required for restoration of the fault can be reduced. For example, an area for temporary traffic restriction of the public traffic network can be narrowed, and the traffic restriction time can be shortened.

What is claimed is:

1. An apparatus for detecting a fault location in an optical fiber line having a signal at a wavelength, comprising:

an optical fiber line including a reflector for reflecting a predetermined reflection wavelength which is different from the signal wavelength, said reflector being disposed at a geographically known position along said optical fiber line; and an optical pulse tester for transmitting a probe pulse light at said reflection wavelength on the optical fiber line, and measuring a Rayleigh back-scattered light from the optical fiber line and a Fresnel reflection light from a fault location in comparison with reflected light from said reflector to determine the position of the fault location in relation to the position of the reflector on a time base.

2. An apparatus for detecting a fault location in an optical fiber line as recited in claim 1 wherein the optical pulse tester transmits a second probe pulse light having a different wavelength than the signal wavelength and the reflection wavelength of the reflector.

3. An apparatus for detecting a fault location in an optical fiber line as recited in claim 1 wherein said optical fiber line includes a plurality of reflectors, each of the reflectors having one of at least two different reflection wavelengths.

4. An apparatus for detecting a fault location in an optical fiber line as recited in claim 3 wherein the optical pulse tester transmits a plurality of probe pulse lights, each of the probe pulse lights having a wavelength corresponding to a different one of said different reflection wavelengths.

5. An apparatus for detecting a fault location in an optical fiber line as recited in claim 4 or 2, wherein the optical pulse tester transmits the probe pulse lights in a predetermined sequence.

6. An apparatus for detecting a fault location in an optical fiber line in an optical transmission system having a plurality of optical fiber lines, each of the optical fiber lines having a signal at a wavelength, comprising:

a plurality of reflectors disposed at geographically known positions in each of the optical fiber lines, each of the reflectors having a reflection wavelength different from the signal wavelength on its respective optical fiber line;

an optical pulse tester for transmitting a probe pulse light on each of the optical fiber lines, each of the probe pulse lights being transmitted at the reflection wavelength of the reflectors in its respective optical fiber line, and measuring reflected light from a fault location in one of the optical fiber lines and the probe pulse light reflected by one of the reflectors in said one of the optical fiber lines on a time base to determine the position of the fault location in relation to the position of said one of the reflectors; and an optical coupler for coupling the probe pulse lights from the optical pulse tester to each of the optical fiber lines, and coupling the reflected light from each of the optical fiber lines to the optical pulse tester.

7. An apparatus for detecting a fault location in an optical fiber line as recited in claim 6 wherein said optical coupler comprises optical adding and dividing means for dividing the probe pulse lights from the optical pulse tester for distribution to each of the optical fiber lines, and adding the reflected light from each of the optical fiber lines for coupling t al pulse tester.

8. An apparatus for detecting a fault location in an optical fiber line having a signal at a wavelength comprising:

a first optical fiber line including a reflector disposed at a geographically known position in said first optical fiber line for reflecting a reflection wavelength different from the signal wavelength;

a second optical fiber line having a length substantially the same as a length of said first optical fiber line; and an optical pulse tester for transmitting a probe pulse light at said reflection wavelength on the first and second optical fiber lines, and measuring reflected light from a fault location in one of said first optical fiber line and said second optical fiber line and the probe pulse light reflected by said reflector on a time base to determine the position of the fault location in relation to the position of the reflector.

9. An apparatus for detecting a fault location in an optical fiber line as recited in claim 8 wherein said first optical fiber line includes a plurality of reflectors, each of the reflectors having one of at least two different reflection wavelengths.

10. An apparatus for detecting a fault location in an optical fiber line as recited in claim 9 wherein said optical pulse tester transmits a plurality of probe pulse lights, each of the probe pulse lights having a wavelength corresponding to a different one of the different reflection wavelengths.

11. An apparatus for detecting a fault location in an optical fiber line as recited in claim 8 wherein said optical pulse tester transmits a second probe pulse light having a different wavelength than said signal wavelength and said reflection wavelength of said reflector.

12. An apparatus for detecting a fault location in an optical fiber line as recited in claim 10 or 11 wherein said optical pulse tester transmits the probe pulse lights in a predetermined sequence.

13. An apparatus for detecting a fault location in an optical fiber line as recited in claim 8 wherein said first optical fiber line and said second optical fiber line are contained in a same optical fiber cable.

* * * * *

UNITED STATES PATENT AND TRADEMARK OFFICE
CERTIFICATE OF CORRECTION

PATENT NO. : 6,185,020 B1
DATED : February 6, 2001
INVENTOR(S) : Yukio Horiuchi and Shiro Ryu It is certified that error appears in the above-identified patent and that said Letters Patent is hereby corrected as shown below:

<u>Column 14,</u>
Line 38, replace "t al" with -- to the optical --.

<u>Column 16,</u>
Line 4, replace "a" with -- the --.

Signed and Sealed this

Twenty-eighth Day of May, 2002

Attest:

Attesting Officer

JAMES E. ROGAN
*Director of the United States Patent and Trademark Office*